United States Patent
Russell et al.

(10) Patent No.: US 9,632,893 B2
(45) Date of Patent: *Apr. 25, 2017

(54) UNOBTRUSIVE FAILOVER IN CLUSTERED NETWORK-ATTACHED STORAGE

(71) Applicant: International Business Machines Corporation, Armonk, NY (US)

(72) Inventors: Lance W. Russell, Rosanky, TX (US); Rong Zeng, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/090,046

(22) Filed: Apr. 4, 2016

(65) Prior Publication Data

US 2016/0217051 A1    Jul. 28, 2016

Related U.S. Application Data

(63) Continuation of application No. 13/929,211, filed on Jun. 27, 2013, now Pat. No. 9,304,861.

(51) Int. Cl.

| | | |
|---|---|---|
| G06F 11/00 | (2006.01) | |
| G06F 11/20 | (2006.01) | |
| G06F 11/14 | (2006.01) | |
| G06F 17/30 | (2006.01) | |
| G06F 11/07 | (2006.01) | |

(52) U.S. Cl.
CPC ...... *G06F 11/2094* (2013.01); *G06F 11/0709* (2013.01); *G06F 11/0793* (2013.01); *G06F 11/1402* (2013.01); *G06F 17/30067* (2013.01); *G06F 17/30082* (2013.01); *G06F 17/30194* (2013.01); *G06F 11/1443* (2013.01); *G06F 2201/805* (2013.01)

(58) Field of Classification Search
CPC .. G06F 11/2025; G06F 11/2069; H04L 69/40; H04L 69/0663
USPC ........................................................ 714/4.11
See application file for complete search history.

(56) References Cited

U.S. PATENT DOCUMENTS

| | | |
|---|---|---|
| 6,625,750 B1 | 9/2003 | Duso et al. |
| 7,164,656 B2 | 1/2007 | Foster et al. |
| 7,167,912 B1 | 1/2007 | Dhingra |
| 7,203,862 B2 | 4/2007 | Fujimoto |
| 7,356,531 B1 | 4/2008 | Popelka et al. |
| 7,426,653 B2 | 9/2008 | Hu et al. |

(Continued)

FOREIGN PATENT DOCUMENTS

| | | |
|---|---|---|
| JP | 2009025965 A | 2/2009 |
| JP | 2012073773 A | 4/2012 |

OTHER PUBLICATIONS

U.S. Appl. No. 15/175,658, filed Jun. 8, 2016, 1 page.

(Continued)

*Primary Examiner* — Elmira Mehrmanesh
(74) *Attorney, Agent, or Firm* — Stephen R. Tkacs; Stephen J. Walder, Jr.; Randall J. Bluestone

(57) ABSTRACT

A mechanism is provided in a data processing system for unobtrusive failover in a clustered file system. A node in the clustered file system periodically monitors publicized resource events from a cluster manager in the clustered file system for a triggering event that triggers a grace period. Responsive to detecting a triggering event, the node enters a grace period without restarting. During the grace period, the node processes a state request from a first client.

17 Claims, 3 Drawing Sheets

(56) References Cited

U.S. PATENT DOCUMENTS

| | | |
|---|---|---|
| 7,447,933 B2 | 11/2008 | Matsunami et al. |
| 7,487,390 B2 | 2/2009 | Saika |
| 7,516,181 B1 | 4/2009 | Du et al. |
| 7,693,892 B2 | 4/2010 | Koarashi et al. |
| 7,822,719 B1 | 10/2010 | Noveck |
| 7,886,050 B2 | 2/2011 | Raja et al. |
| 7,962,915 B2 | 6/2011 | Eshel et al. |
| 8,117,487 B1 | 2/2012 | Raut et al. |
| 8,122,284 B2 | 2/2012 | Taylor et al. |
| 8,260,926 B2 | 9/2012 | Narayana et al. |
| 8,296,599 B1 | 10/2012 | Boyer et al. |
| 2003/0140149 A1 | 7/2003 | Marejka et al. |
| 2003/0196148 A1 | 10/2003 | Harrisville-Wolff et al. |
| 2004/0249904 A1 | 12/2004 | Moore et al. |
| 2006/0212453 A1 | 9/2006 | Eshel et al. |
| 2007/0180305 A1 | 8/2007 | Fujimoto |
| 2007/0244962 A1 | 10/2007 | Laadan et al. |
| 2009/0077233 A1 | 3/2009 | Kurebayashi et al. |
| 2011/0087899 A1 | 4/2011 | Fetik |
| 2012/0254443 A1 | 10/2012 | Ueda |
| 2012/0259819 A1 | 10/2012 | Patwardhan et al. |
| 2012/0259820 A1 | 10/2012 | Patwardhan |
| 2013/0247066 A1 | 9/2013 | Dodge et al. |
| 2014/0173092 A1 | 6/2014 | Uluderya et al. |
| 2014/0258521 A1 | 9/2014 | English et al. |
| 2015/0074252 A1 | 3/2015 | Rattner et al. |

OTHER PUBLICATIONS

International Application No. PCT/CA2014/050490; International Search Report and Written Opinion dated Sep. 9, 2014, 7 pages.
U.S. Appl. No. 13/927,433, filed Mar. 15, 2016, 2 pages.
U.S. Appl. No. 13/929,211, filed Mar. 15, 2016, 2 pages.
Adam, Michael et al., "Clustered NAS for Everyone Clustering Samba with CTDB", NLUUG Spring Conference 2009, May 7, 2009, 15 pages.
Gobioff, Howard et al., "Security for Network Attached Storage Devices", School of Computer Science, Carnegie Mellon University, Pittsburgh, PA, Oct. 23, 1997, 20 pages.
Guijarro, Manuel et al., "Experience and Lessons learnt from running High Availability Databases on Network Attached Storage", IOP Publishing Ltd, international Conference on Computing in High Energy and Nuclear Physics (CHEP'07), Journal of Physics: Conference Series 119, No. 4, Jul. 2008, 10 pages.
Shepler, S. at al., "Network File System (NFS) version 4 Protocol", IETF Network Working Group, RFC 3530, Apr. 2003, 249 pages.

UNOBTRUSIVE FAILOVER IN CLUSTERED NETWORK-ATTACHED STORAGE

BACKGROUND

The present application relates generally to an improved data processing apparatus and method and more specifically to mechanisms for unobtrusive failover in clustered network-attached storage.

A clustered file system is a file system that is shared by being simultaneously mounted on multiple servers. Clustered file systems can provide features like location-independent addressing and redundancy which improve reliability or reduce the complexity of the other parts of the cluster. Parallel file systems area type of clustered file system that spread data across multiple storage nodes, usually for redundancy or performance.

Network-attached storage (NAS) provides both storage and a file system, like a shared disk file system on top of a storage area network (SAN). NAS is file-level computer data storage connected to a computer network providing data access to a heterogeneous group of clients. NAS not only operates as a file server, but is specialized for this task either by its hardware, software, or configuration of those elements. NAS is often manufactured as a computer appliance, a specialized computer built from the ground up for storing and serving files, rather than simply a general purpose computer being used for the role.

NAS systems are networked appliances which contain one or more hard drives, often arranged into logical, redundant storage containers or redundant array of independent disks (RAID). Network-attached storage removes the responsibility of file serving from other servers on the network. They typically provide access to files using network file sharing protocols such as network file system (NFS) or server message block/common Internet file system (SMB/CIFS).

SUMMARY

In one illustrative embodiment, a method, in a data processing system, is provided for unobtrusive failover in a clustered file system. The method comprises periodically monitoring, by a given node in the clustered file system, publicized resource events from a cluster manager in the clustered file system for a triggering event that triggers a grace period. The method further comprises responsive to detecting a triggering event, entering, by the given node, a grace period without restarting. The method further comprises during the grace period, processing, by the given node, a state request from a first client.

In other illustrative embodiments, a computer program product comprises a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will he described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
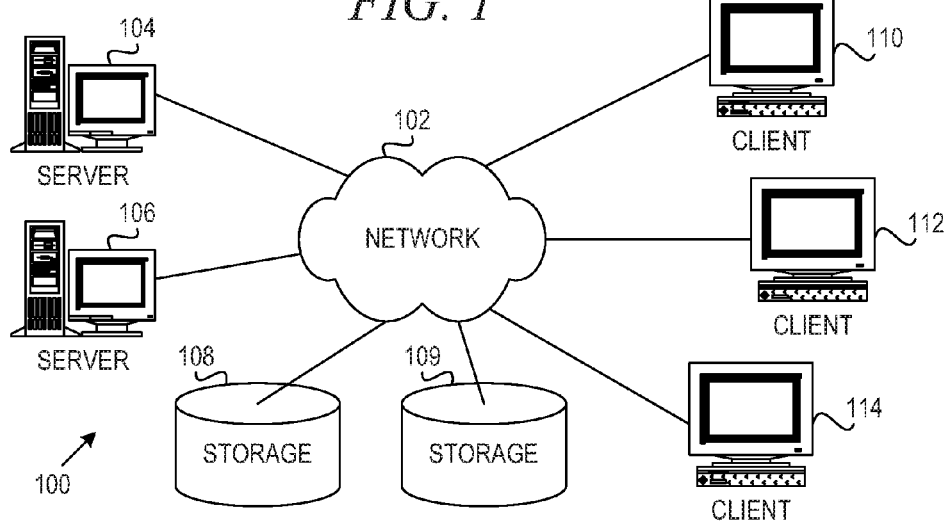
FIG. 1 depicts a pictorial representation of an example clustered file, system in which aspects of the illustrative embodiments may be implemented.

The illustrative embodiments provide a mechanism for unobtrusive failover in clustered network-attached storage. Network-attached storage (NAS) protocols, particularly NFS, define certain requirements of a server during recovery. Specifically, if the server loses state (locking, open, or delegation) as the result of a node failure, it must allow clients time to discover this fact and reestablish the lost state. For example, the client must be able to reestablish locking state without having the server deny valid requests because the server has granted conflicting access to another client. Likewise, if there is a possibility that clients have not yet reestablished their locking state for a file, in certain cases, the server must disallow READ and WRITE operations for that file.

The period of special handling for state reclamation is referred to as the "grace period" and is typically many seconds in length. Each server in the grace period (in grace) allows disrupted clients to reclaim state, e.g., locks or special privileges such as the delegation of file update responsibilities. Any event that disrupts a client to the point that it has to reconnect and reclaim state may trigger a grace period. Such events may include complete failure of a node, for example, and typically result in moving an Internet Protocol address from the failed node to another node; however, such events are broadly referred to herein as "grace triggering events" or simply "triggering events." IP addresses may also be moved from one cluster node to another for load balancing reasons.

In a clustered NAS file system, grace period implementation presents a series of challenges. A single node failure directly impacts only a subset of the cluster's clients, but all server nodes in the cluster must be put into grace period handling. During the grace period, the server must not grant conflicting requests to other clients. For example, the server must not give a lock on the same file that the disrupted client held to another client. In a clustered system, this must be implemented cluster wide. This is because any server node in the cluster may grant a conflicting request e.g., grant a lock on the same file the disrupted client held).

In addition, the failed clients make special requests (RE-CLAIMS) in order to reestablish state. These special requests must be handled only from the allowed clients and only during the grace period; otherwise, an error (ENOGRACE) must be returned. In a clustered NAS file system, anode failure usually results in the clients of the failed node being relocated to other nodes. This implies that not only must all nodes of the cluster be put into grace, but they must be aware of the cluster clients that are allowed to make RECLAIM operations.

In general, the only way to force a protocol service server to invoke grace period is to restart. Given the above, the typical procedure to enforce grace period in a cluster is by restarting the protocol service on all nodes of the cluster, forcing all cluster clients to reclaim state and handling only RECLAIM operations for the entire grace period. Because all server nodes only grant RECLAIM operations during the grace period, this works, but is highly disruptive to the cluster. This is an obtrusive failover and results in a significant degradation of the protocol service cluster-wide. If all protocols serviced by the NAS honor the grace period then the degradation extends further.

The illustrative embodiments recognize there is nothing in the protocol standards requiring obtrusive failover. Specifically, if the server can reliably determine that granting a non-reclaim request will not conflict with reclamation of state by other clients, the server does not have to return an error and can service the non-reclaim client request. The illustrative embodiments present a methodology to establish reliability and implement an unobtrusive failover in a clustered NAS system.

The mechanisms of the illustrative embodiments apply the following:

1) Whenever any server in the cluster grants reclaimable state to a client, the server publicizes the state information so it is accessible to all server nodes in the cluster. This publication may be performed by making an entry in the clustered file system or by multicasting the state information to the other server nodes in the cluster, for example. There are other methods, as well. The state information may include, but is not limited to, the following: a) the server node granting the state, b) the client granted the state, c a state description (e.g., the file or delegation, etc.), and d) expiration of the state.

2) A cluster manager monitors cluster manager events, which identify when an event occurs that will disrupt clients. These events may include server failures and IP address relocations. Such an event also indicates on which cluster server node the triggering event happened.

3) The cluster manager publicizes the triggering event information to all server nodes in the cluster.

4) Each server node performs optimized response to the disruption event. All server nodes recall the state grants of the impacted server node(s) (obtained from (1) above). This tells the current server node from which clients to expect RECLAIM operations, what files are impacted, and what state. The server nodes then continue normal operation with the following grace period exceptions: a) if a reclaim operation is received then the client and the state request are verified against the expected list and the reclaim operation is granted if confirmed, b) if a client not on the reclaim list requests a normal state grant then the expected list is checked for conflicts. For example, an open request for a file on the expected reclaim list would, generally, conflict. The state grant is denied if it conflicts and processed if it does not conflict.

Figure 2:
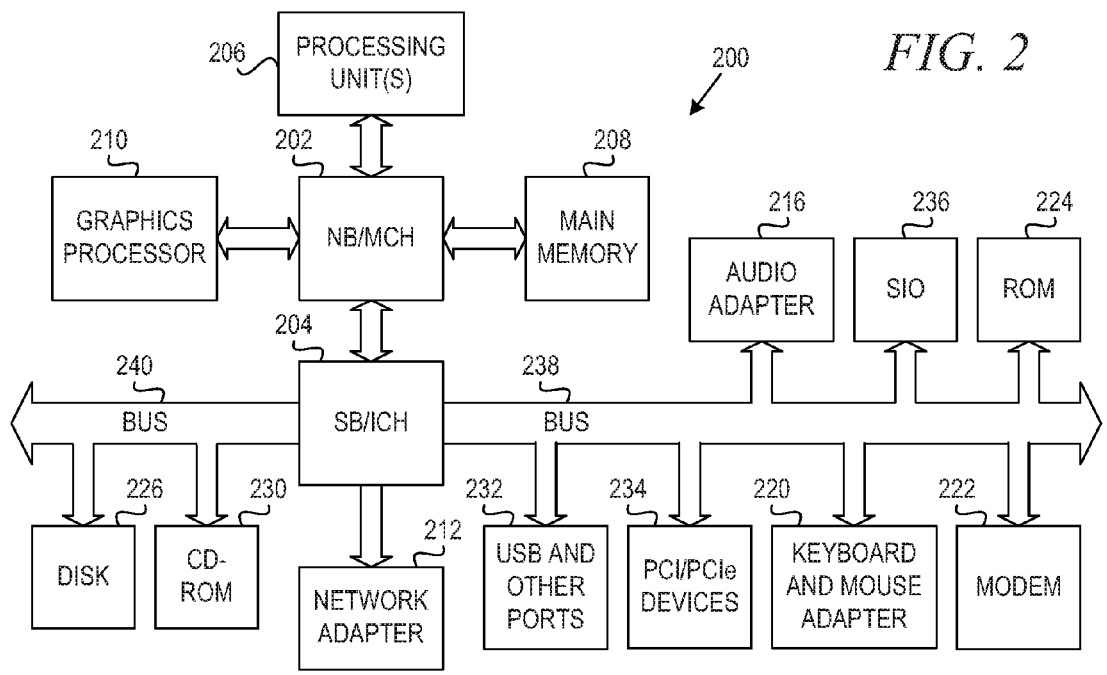
FIG. 2 is a block diagram of an example data processing system in which aspects of the illustrative embodiments may be implemented.

The illustrative embodiments my be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example clustered file system in which aspects of the illustrative embodiments may be implemented. Clustered file system 100 may include a network of computers in which aspects of the illustrative embodiments may be implemented. The clustered file system 100 contains at least one network 102, which is the medium used to provide communication links between various devices and computers connected together within clustered file system 100. The network 102 may, include connections, such as wire, wireless communication links, or fiber optic cables.

In the depicted example, server 104 and server 106 are connected to network 102 along with storage units 108, 109. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Clustered file system 100 may include additional servers, clients, and other devices not shown.

In one embodiment, storage units 108, 109 are network-attached storage (NAS) device, and servers 104, 106 allow clients 110, 112, 114 to access the NAS devices. The protocol service is a software layer existing on the server and client where the server provides the service and where the client accesses the service. In the depicted example, servers 104, 106 provide the protocol service to clients 110, 112, 114 to access NAS devices. In one illustrative embodiment of the clustered file system 100, any of the servers 104, 106 can serve any of the clients 110, 112, 114 to provide access to any of the NAS devices 108, 109.

In the depicted example, clustered file system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in I should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG, 2. As a client, the operating system may be a commercially available operating system such as Microsoft Windows 7 (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 200 (Java is a trademark of Oracle and/or its affiliates.).

As a server, data processing system 200 may be, for example, an IBM® eServer™ System p® computer system, running the Advanced Interactive Executive (AIX®) operating system or the LINUX operating system (IBM, eServer, System p, and AIX are trademarks of International Business Machines Corporation in the United States, other countries, or both, and LINUX is a registered trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
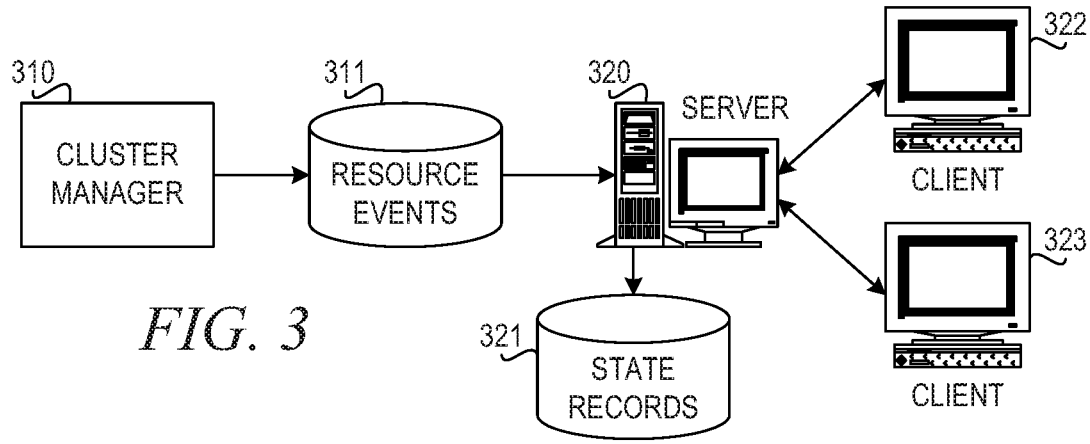
FIG. 3 is a block diagram illustrating components for unobtrusive failover in a clustered file system in accordance with an illustrative embodiment.

FIG. 3 is a block diagram illustrating components for unobtrusive failover in a clustered file system in accordance with an illustrative embodiment. The clustered file system includes cluster manager 310. The purpose of cluster manager 310 is to monitor resources within the cluster and to post resource events 311 when cluster state changes. Cluster manager 310 monitors either node availability or the location from/to which public addresses, such as Internet Protocol (IP) addresses, are being moved. It may monitor other things as well, such as the existence of service processes on server nodes. In the depicted example, as described herein, cluster manager 310 monitors the location from/to which public IP addresses are moved. In the depicted example, anode becoming unavailable or movement of a public address may indicate an event that triggers a grace period, as will be described below.

Cluster manager 310 publicizes resource events 311 in a manner accessible to all nodes in the cluster. Examples of resource events 311 may include node up/down, IP address moved from/to, etc. In one example embodiment, cluster manager 310 writes resource events 311 in the cluster file system. Alternatively, cluster manager 310 may multicast resource events 311 on the cluster network.

In accordance with an illustrative embodiment, the protocol service server 320 is modified such that entering grace period handling is programmable (i.e., possible to invoke without restarting the protocol service server 320). When any server 311 in the cluster grants state (lock, open, delegation, etc.) to a client 322, 323, the following state record information 321 is written to stable store:

1. An identifier for the cluster node granting the state;
2. An identifier for the file associated with the state;
3. State type (open, lock, delegation, etc.);
4. An identifier for the client being granted the state; and,
5. The IP address of the client being granted the state.

The above state record information 321 must be accessible to all nodes of the cluster. In one example embodiment, protocol service server 320 writes the state record information 321 to the cluster file system, although other approaches may be used depending upon the implementation. For example, protocol server 320 may multicast the state record so that it is made available to all server nodes in the cluster.

The protocol service server 320 on each node periodically monitors the resource event information 311 being publicized by the cluster manager 310. For example, server 320 may monitor resource events 311 every five seconds. This period may depend upon the implementation. In one example embodiment, in monitoring resource events server 320 ignores all events except IP relocations. If an IP address is moved anywhere in the cluster, all nodes initiate grace. This transition happens without restarting the protocol server 320.

While in grace, the following special processing occurs:
1. If the node of server 320 is not the target of an IP address movement, it should not be receiving RECLAIM operations. If this is the case, then server 320 rejects all RECLAIM operations from clients 322, 323 with an appropriate error code.
2. If the node of server 320 is the target of an IP address movement and it receives a RECLAIM operation, then server 320 examines state records 321 written by the node from where the IP address has been moved. If a record is found with a matching IP address, client identifier, and state, then server 320 grants the RECLAIM operation. If not, server 320 rejects the RECLAIM operation.
3. If any state request is received from clients 322, 323 on the node of server 320, then server 320 examines state records 321 written by the node where an IP address has been removed (i.e., the node that triggered the grace). If a record is found with a matching file identifier and a conflicting state request, then server 320 rejects the state request with an error (ERROR INGRACE). Grace events disrupt the connection that clients have with the server. This disruption triggers the RECLAIM operation. If a matching record is not found, server 320 processes the state request normally. For instance, the request could be for a lock whose range does not conflict with the expected reclaim. This request may be granted.

With this procedure in place, most protocol requests are handled normally even if the cluster is in grace. No server is restarted except on the failing node. No clients unattached to the failing node are forced to reestablish state. Specific grace processing is isolated only to the impacted nodes.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. Them computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 4:
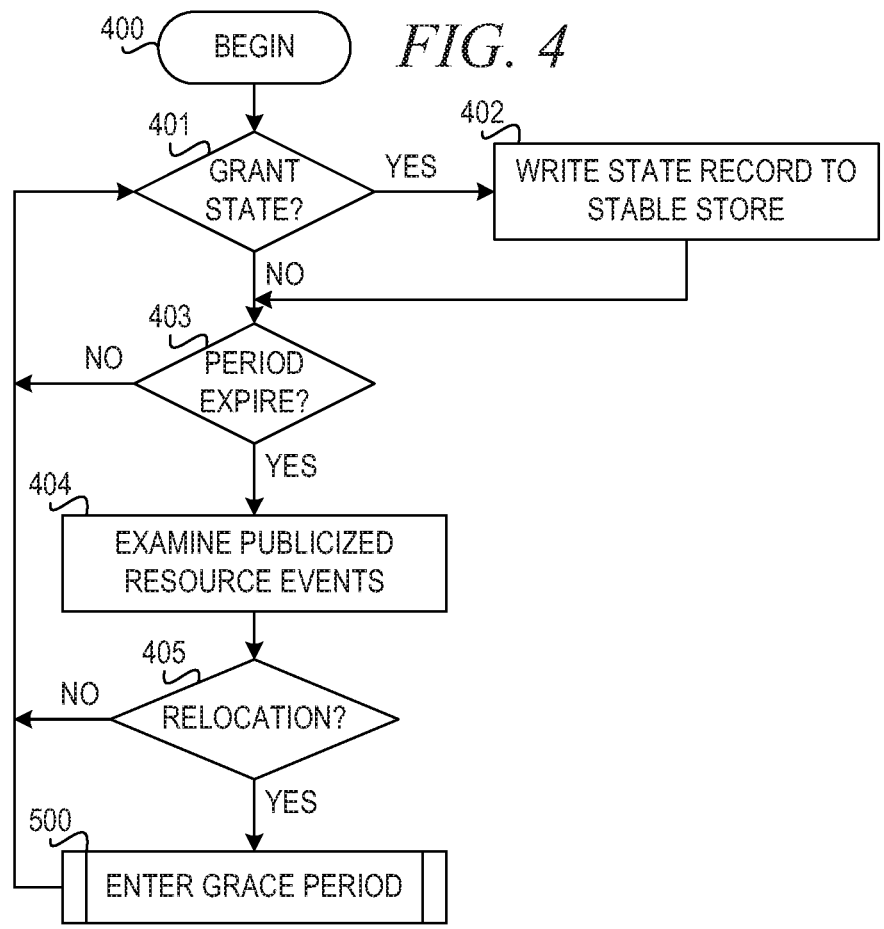
FIG. 4 is a flowchart illustrating operation of a node in a clustered file system monitoring cluster state events in accordance with an illustrative embodiment.

FIG. 4 is a flowchart illustrating operation of a node in a clustered file system monitoring cluster state events in accordance with an illustrative embodiment. Operation begins (block 400), and the node determines whether it is granting a state (block 401). If the node is granting a state, the node writes a state record to a stable store (block 402) or alternatively multicasts the state record. The state record includes the following information:

1. An identifier for the cluster node granting the state;
2. An identifier for the file associated with the state;
3. State type (open, lock, delegation, etc.);
4. An identifier for the client being granted the state; and,
5. The IP address of the client being granted the state.

Thereafter, or if the node is not granting a state in block 401, the node determines whether a monitor period expires (block 403). The node periodically monitors resource events for events that trigger a grace period. If the monitor period does not expire, operation returns to block 401 to determine whether the node grants a state.

If the monitor period expires in block 403, the node examines resource events publicized by the cluster manager (block 404). The node then determines whether a resource event exists corresponding to an IP address being moved (block 405). In the illustrative embodiment, a resource event corresponding to an IP address being moved is indicative of an event that triggers a grace period. In alternative embodiments, other such trigger events may be detected, such as a node becoming available, for example. If such a relocation event does not exist, operation returns to block 401 to determine whether the node grants a state.

If the node determines a resource event exists that corresponds to an IP address being moved (or other grace triggering event) in block 405, the node enters a grace period (block 500). When the node completes the grace period, operation returns to block 401 to determine whether the node grants a state. Operation of the node during the grace period is described in further detail below with reference to FIG. 5. Thus, the node monitors resource events publicized by the cluster manger but ignores all events except grace triggering events. When a grace triggering event occurs, all nodes initiate grace. This transition happens without restarting the NAS server, except for the failing node, which caused the relocation event.

Figure 5:
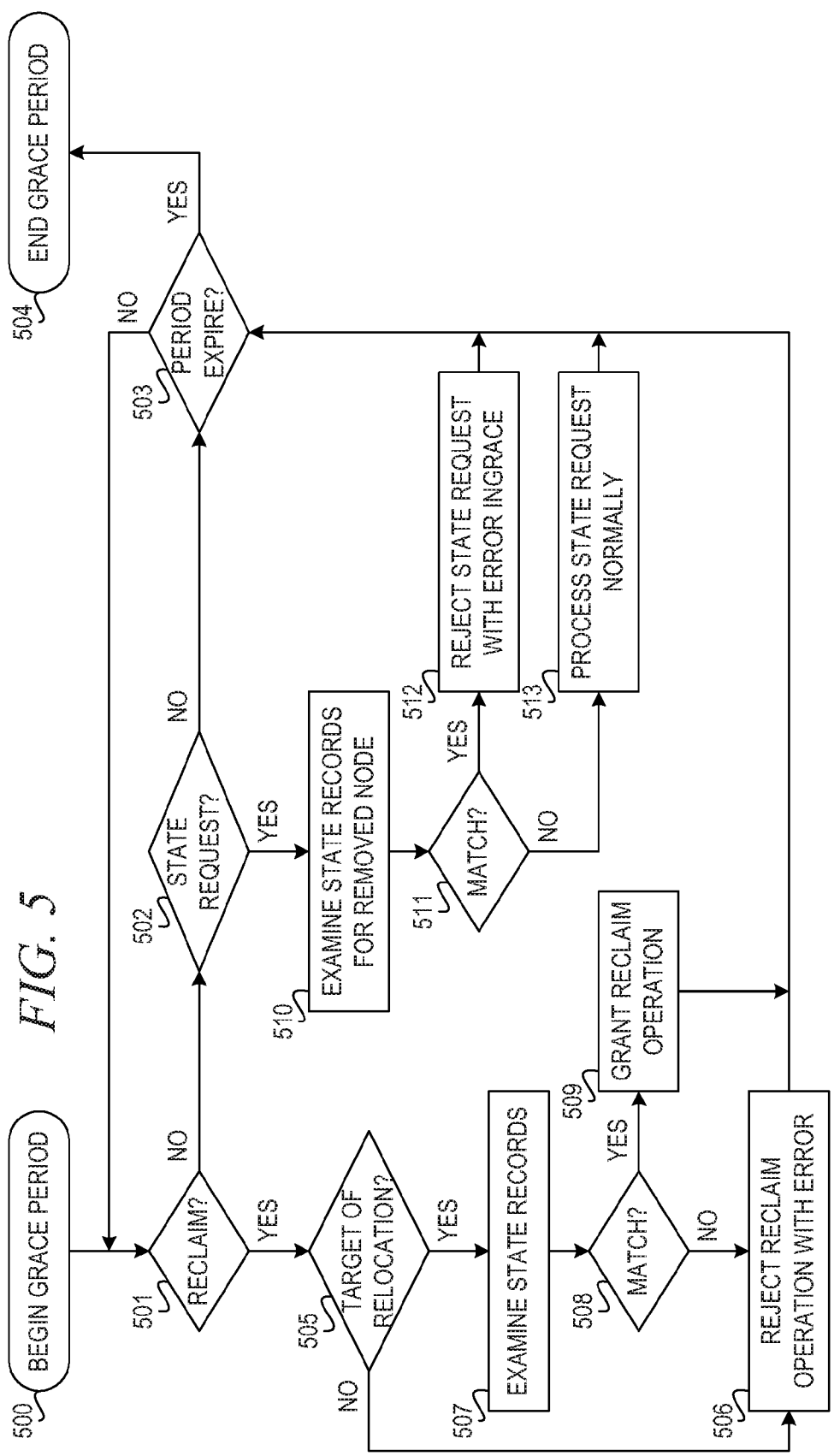
FIG. 5 is a flowchart illustrating operation of a grace period for a node in a clustered file system in accordance with an illustrative embodiment.

FIG. 5 is a flowchart illustrating operation of a grace period for a node in a clustered file system in accordance with an illustrative embodiment. Operation begins when the node begins the grace period (block 500). The node determines whether a RECLAIM operation is received from a client (block 501). Processing of a RECLAIM operation is described below with reference to blocks 505-509. If a RECLAIM event is not received, the node determines whether a state request is received from a client (block 502). Processing of a state request is described below with reference to blocks 510-513. If a state request is not received, the node determines whether the grace period expires (block 503). If the grace period expires, the node ends the grace period (block 504); otherwise, operation returns to block 501 to determine whether a RECLAIM operation is received. Thus, the node processes RECLAIM operations and state requests as described until the grace period expires in block 503.

Turning to block 501, if the node receives a RECLAIM operation, the node determines whether the node is the target of an IP address relocation (block 505). If the node is not the target of a relocation event, the node rejects the RECLAIM operation with the appropriate error code (block 506). Thereafter, operation proceeds to block 503 to determine whether the grace period expires.

If the node is the target of an IP address relocation in block 505, the node examines state records written by the node from where the IP address has been moved (block 507). The node determines whether a state record exists with a matching IP identifier, client identifier, and state (block 508). If a matching record does not exist, the node rejects the RECLAIM operation with the appropriate error code (block 506), and operation proceeds to block 503 to determine whether the grace period expires. If a matching record exists in block 508, the node grants the RECLAIM operation (block 509), and operation proceeds to block 503 to determine whether the grace period expires.

Turning to block 502, if the node receives a state request, the node examines state records written by the node where an IP address has been removed (i.e., the node that triggered grace) (block 510). The node then determines whether a record is found with a matching file identifier (block 511) and conflicting state. If a matching record is found, the node rejects the state request with an error (ERROR INGRACE) (block 512), and operation proceeds to block 503 to determine whether the grace period expires. If a matching record is not found in block 511, the node processes the state request normally (block 513), and operation proceeds to block 503 to determine whether the grace period expires.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for unobtrusive failover in a clustered file system, the method comprising:
   periodically monitoring, by a protocol server on a given node in the clustered file system, publicized resource events from a cluster manager in the clustered file system for a triggering event that triggers a grace period;
   responsive to detecting a relocation event, entering, by the protocol server on the given node, a grace period without restarting the protocol server on the given node, wherein the relocation event corresponds to moving an Internet Protocol address; and
   during the grace period for a reclaim operation from a first client and responsive to determining the given node is a target of the relocation event, examining, by the protocol server on the given node, state records written by a node from where the Internet Protocol address has been moved;
   determining, by the protocol server on the given node, whether a record is found with an Internet Protocol identifier, a client identifier, and a state matching the reclaim operation; and
   responsive to a matching record being found, granting, by the protocol server on the given node, the reclaim operation.

2. The method of claim 1, further comprising:
   responsive to a matching record not being found, rejecting the reclaim operation.

3. The method of claim 1, further comprising processing a state request from a second client during the grace period, comprising:
   examining state records written or transmitted by a node where the Internet Protocol address has been removed;
   determining whether a record is found with fife identifier matching the state request;
   responsive to a matching record not being found, processing the state request; and
   responsive to a matching record being found, rejecting the state request.

4. The method of claim 1, wherein the given node is modified such that entering grace period handling is programmable.

5. The method of claim 1, wherein the cluster manager publicizes resource events by writing the resource events to the clustered file system.

6. The method of claim 1, wherein the cluster manager publicizes resource events by multicasting the resource events.

7. A computer program product comprising a non-transitory computer readable storage medium having a computer readable program stored therein, wherein the computer readable program, when executed on a computing device, causes the computing device to:
   periodically monitor, by a protocol server on a given node in the clustered file system, publicized resource events from a cluster manager in the clustered file system for a triggering event that triggers a grace period;
   responsive to detecting a relocation event, enter, by the protocol server on the given node, a grace period without restarting the protocol server on the given node, wherein the relocation event corresponds to moving an Internet Protocol address;
   during the grace period for a reclaim operation from a first client and responsive to determining the given node is a target of the relocation event, examine, by the protocol server on the given node, state records written by a node from where the Internet Protocol address has been moved;
   determine, by the protocol server on the given node, whether a record is found with an Internet Protocol identifier, a client identifier, and a state matching the reclaim operation; and
   responsive to a matching record being found, grant, by the protocol server on the given node, the reclaim operation.

8. The computer program product of claim 7, wherein the computer readable program further causes the computing device to:
   responsive to a matching record not being found, reject the reclaim operation.

9. The computer program product of claim 7, wherein the computer readable program further causes the computing device to process a state request from a second client during the grace period, comprising:
   examining state records written or transmitted by a node where the Internet Protocol address has been removed;
   determining whether a record is found with file identifier matching the state request;
   responsive to a matching record not being found, processing the state request; and
   responsive to a matching record being found, rejecting the state request.

10. The computer program product of claim 7, wherein the given node is modified such that entering grace period handling is programmable.

11. The computer program product of claim 7, wherein the cluster manager publicizes resource events by writing the resource events to the clustered file system.

12. The computer program product of claim 7, wherein the cluster manager publicizes resource events by multicasting the resource events.

13. An apparatus comprising:
a processor; and
a memory coupled to the processor, wherein the memory comprises instructions which, when executed by the processor, cause the processor to:
periodically monitor, by a protocol server on a given node in the clustered file system, publicized resource events from a cluster manager in the clustered file system for a triggering event that triggers a grace period;
responsive to detecting a relocation event, enter, by the protocol server on the given node, a grace period without restarting the protocol server on the given node, wherein the relocation event corresponds to moving an Internet Protocol address;
during the grace period for a reclaim operation from a first client and responsive to determining the given node is a target of the relocation event, examine, by the protocol server on the given node, state records written by a node from where the Internet Protocol address has been moved;
determine, by the protocol server on the given node, whether a record is found with an Internet Protocol identifier, a client identifier, and a state matching the reclaim operation; and
responsive to a matching record being found, grant, by the protocol server on the given node, the reclaim operation.

14. The apparatus of claim 13, wherein the given node is not a target of the relocation event, wherein the instructions further cause the processor to:
responsive to a matching record not being found, reject the reclaim operation.

15. The apparatus of claim 13, wherein the instructions further cause the processor to process a state request from a second client during the grace period, comprising:
examining state records written by a node where the Internet Protocol address has been removed;
determining whether a record is found with file identifier matching the state request;
responsive to a matching record not being found, processing the state request; and
responsive to a matching record being found, rejecting the state request.

16. The apparatus of claim 13, wherein the given node is modified such that entering grace period handling is programmable.

17. The apparatus of claim 13, wherein the cluster manager publicizes resource events by writing the resource events to the clustered file system.

* * * * *